(12) United States Patent
Kalotay et al.

(10) Patent No.: US 7,707,104 B2
(45) Date of Patent: Apr. 27, 2010

(54) SYSTEM AND A METHOD FOR DETERMINING WHETHER TO REFINANCE A CONSUMER DEBT INSTRUMENT

(75) Inventors: Andrew J. Kalotay, New York, NY (US); Deane Yang, New York, NY (US)

(73) Assignee: Andrew Kalotay, New York, NY (US)

( * ) Notice: Subject to any disclaimer, the term of this patent is extended or adjusted under 35 U.S.C. 154(b) by 901 days.

(21) Appl. No.: 11/387,150

(22) Filed: Mar. 22, 2006

(65) Prior Publication Data
US 2006/0218080 A1 Sep. 28, 2006

Related U.S. Application Data

(60) Provisional application No. 60/665,142, filed on Mar. 25, 2005, provisional application No. 60/665,780, filed on Mar. 28, 2005.

(51) Int. Cl.
G06Q 40/00 (2006.01)
(52) U.S. Cl. .................. 705/38; 705/35; 705/36 R; 707/3; 707/10; 455/414.3
(58) Field of Classification Search .............. 705/1–50; 707/3, 10, 103; 455/414.3; 715/530; 706/20
See application file for complete search history.

(56) References Cited

U.S. PATENT DOCUMENTS

| | | | |
|---|---|---|---|
| 4,876,648 A | 10/1989 | Lloyd | |
| 5,878,404 A | 3/1999 | Stout, Jr. et al. | |
| 5,946,668 A | 8/1999 | George | |
| 5,966,700 A | 10/1999 | Gould | |
| 6,269,347 B1 | 7/2001 | Berger | |
| 6,345,262 B1 | 2/2002 | Madden | |
| 6,513,019 B2 | 1/2003 | Lewis | |
| 6,671,677 B2 | 12/2003 | May | |
| 6,778,968 B1 | 8/2004 | Gulati | |

(Continued)

OTHER PUBLICATIONS

Darrell Duffie and Nicolae Garleanu, Risk and Valuation of Collateralized Debt Obligations, Stanford University, Preliminary, pp. 1-30.*

(Continued)

Primary Examiner—James P Trammell
Assistant Examiner—Marissa Liu
(74) Attorney, Agent, or Firm—Foley & Lardner LLP (57) ABSTRACT

A method and system for calculating an indicator which can be used for determining whether to refinance an outstanding debt instrument (such as a mortgage) with a new debt instrument (such as another mortgage), which includes the steps of (1) determining the change in the present value of the cash flows using a set of discount factors; (2) determining the change in option values using a probabilistic model of future discount factors; and (3) determining the indicator reflecting whether refinancing is probabilistically financially advisable by comparing the change in cash flow values with the change in option values. These steps can be implemented by a computer which includes a CPU and a computer code operatively associated with the CPU. The calculated indicator or its derivative, reflecting whether refinancing is probabilistically financially advisable, can be displayed on a visual display, communicated by an audio device or used to automatically commence refinancing.

35 Claims, 9 Drawing Sheets

U.S. PATENT DOCUMENTS

| | | | |
|---|---|---|---|
| 6,839,686 | B1 | 1/2005 | Galant |
| 7,089,503 | B1 | 8/2006 | Bloomquist et al. |
| 2001/0013017 | A1 | 8/2001 | Berger |
| 2002/0019805 | A1 | 2/2002 | Kalotay |
| 2002/0046158 | A1 | 4/2002 | Kelly |
| 2002/0059136 | A1 | 5/2002 | May |
| 2003/0036988 | A1* | 2/2003 | James .................. 705/35 |
| 2003/0093351 | A1 | 5/2003 | Sarabanchong |
| 2003/0182220 | A1 | 9/2003 | Galant |
| 2004/0059670 | A1 | 3/2004 | Mills |
| 2004/0064402 | A1 | 4/2004 | Dreyer et al. |
| 2004/0162734 | A1 | 8/2004 | Speece |
| 2004/0167850 | A1 | 8/2004 | Dreyer |
| 2004/0210502 | A1 | 10/2004 | Madhavan et al. |
| 2005/0216384 | A1 | 9/2005 | Partlow et al. |
| 2007/0055603 | A1 | 3/2007 | Kalotay |
| 2007/0067233 | A1 | 3/2007 | Dalal |
| 2007/0130041 | A1 | 6/2007 | Strela et al. |
| 2007/0136181 | A1 | 6/2007 | Miller |
| 2007/0150396 | A1 | 6/2007 | Rossen et al. |
| 2007/0219883 | A1 | 9/2007 | Bronsnick et al. |
| 2007/0244836 | A1 | 10/2007 | Kalotay |
| 2008/0215497 | A1 | 9/2008 | Dillon |

OTHER PUBLICATIONS

Andrew Kalotay and Leslie Abreo, "Ratchet Bonds: Maximum Refunding Efficiency at Minimum Transaction Cost," 12 J. of Applied Corp. Fin. 40 (Bank of America, Spring 1999).

Bjorn Flesaker and Ehud I. Ronn, "The Pricing of FIREARMS ("Falling Interest Rate Adjustable —Rate Mortgages")," 6 J. of Real Estate Fin. & Econ. 251 (Kluwer Academic 1993).

W. M. Boyce and A. J. Kalotay, "Tax Differentials and Callable Bonds," 34 J. of Fin. 825 (Sep. 1979).

Andrew Kalotay, "Agency Bonds and the Role of Bermudan Swaptions," $10_{th}$ Annual Fixed Income Summit, Dec. 2, 2002, Palm Beach, Florida.

"Need Mortgage Management," http://www.arcloan.com, accessed Jan. 24, 2005.

"Refinancing Using the Automatic Rate Cut Loan," http://www/arcloan.com/browse.asp?finc=2, accessed Jan. 24, 2005.

"Mortgage Calculators," http://www.arcloan.com/browse.asp?altfunc=2, accessed Jan. 24, 2005.

"Refinance Calculator," http://www.arcloan.com/refcalculator.asp?altfunc=2&cal=1, accessed on Jan. 24, 2005.

"Pre Qualify for a Mortgage Online," http://www.arcmtg.com/id.html, accessed on Jan. 24, 2005.

Andrew Kalotay, Deane Yang, and Frank Fabozzi, "An Option-Theoretic Prepayment Model for Mortgages and Mortgage-backed Securities," Int'l J. Theoretical & Applied Fin., Dec. 2004, vol. 7, No. 8, World Scientific, New Jersey.

Banfield, Mortgages 101-Using Option-Adjusted-Spread Analysis to Extract Prepayment Option Costs from Mortgage Yields, Sep. 21, 2004 (10 pages).

Kalotay et al., "A Model for Valuing Bonds and Embedded Options" Financial Analysts Journal, May/Jun. 1993, vol. 49, No. 3, ProQuest Central, pp. 35-46.

Ross et al., "Net Present Value", Corporate Finance, pp. 68-70.

Walkenbach, First Look: Excel 2002, http://www.pcworld.com/printable/article/id.49607/printable.html, May 31, 2001, (2 pages).

"What is an Annual Percentage Rate (APR)?", http://web.archive.org/web/*/http://www.mtg-net.com/sfaq/faq/apr.htm, Internet Archive Wayback Machine, Feb. 3, 2002 (3 pages).

* cited by examiner

SYSTEM AND A METHOD FOR DETERMINING WHETHER TO REFINANCE A CONSUMER DEBT INSTRUMENT

The present application claims the benefit of priority to U.S. Provisional Patent Application No. 60/665,142 filed Mar. 25, 2005 and U.S. Provisional Patent Application No. 60/665,780 filed Mar. 28, 2005, both of which are incorporated by reference in their entirety.

BACKGROUND OF THE INVENTION

The present invention relates generally to the refinancing of consumer debt instruments. More specifically, the present invention relates to a system and a method for determining whether to refinance a consumer debt instrument, such as, a mortgage.

Consumers often obtain financing in connection with purchases of assets of significant value. For example, most consumers, who purchase a home or a condominium or a car, obtain financing secured by the value of the purchased asset. A home or a condominium is usually a person's single largest asset. Further, the purchase price of a home or condominium may exceed the buyer's net worth and often exceeds that person's annual income by a multiple of two, three, or even more. Consumers usually finance the purchase of their homes or condominiums through mortgages. A mortgage includes a security interest on the house or the condominium and a debt instrument in the form of a promissory note providing for payment of the debt, usually on a monthly basis. In order to minimize monthly mortgage payments, consumers usually obtain long-term mortgages with notes in which payment of the mortgage principal is amortized over a period of years, generally ten, fifteen or thirty years. Similarly, consumers who purchase cars often obtain financing which involves a promissory note specifying how the loan is to be paid and a security interest on the car to guarantee payments. Most car loans are amortized over a shorter time than mortgages, often two to five years.

Most home mortgages currently fall into two categories with respect to interest calculations: fixed-rate mortgages (FRM) and adjustable-rate mortgages (ARM). FRMs carry a fixed interest rate until they are fully amortized or until they are paid off early because the home has been sold or the FRM is refinanced. ARMs carry an interest-rate that adjusts periodically, usually but not necessarily on the anniversary date of the mortgage. In recent years, some homebuyers have obtained hybrid mortgages which are a combination of FRMs and ARMs. Such hybrid mortgages continue for a period of time as fixed rate mortgages (FRMs) and at a pre-determined time (which may be selected by the mortgagor), the FRM is converted to an ARM on pre-agreed terms.

In the United States, most mortgages can be paid off prior to the maturity date and most mortgages can be paid off without a pre-payment penalty. Some mortgages and many other consumer debt instruments impose pre-payment penalties if the instrument is paid before the maturity date. For various reasons, it may be advantageous for a consumer to refinance his or her debt instrument, such as a mortgage note. For example, if the interest rate falls low enough the consumer may realize savings by replacing its existing debt instrument with a new debt instrument carrying a lower interest rate. Even if a debt instrument provides for a pre-payment penalty, the savings due to the lower interest rate of the new instrument can make the refinancing advisable. However, refinancing often involves substantial costs aside from a pre-payment penalty. For example, a homeowner who refinances his or her mortgage typically must pay appraisal fees, title insurance fee, application fees, settlement fees, and a host of other fees, costs and taxes. The fees, costs and taxes associated with refinancing of a mortgage can easily boost the total cost of refinancing to thousands of dollars even where there is no pre-payment penalty. The homeowner usually pays cash up front to cover the refinancing costs or, in the alternative, finances them in the replacement mortgage. In the alternative, some of the costs may be paid up front and the rest included in the replacement mortgage.

Deciding when to refinance a consumer debt instrument, such as a mortgage, can be a financially important decision regardless of whether such instrument can be refinanced at will, only a predetermined number of times or only once. If the instrument can be refinanced at will or multiple times, refinancing should be considered if it results in savings. However, because of the costs associated with refinancing and/or prepayment penalties, multiple refinancings can eliminate much or, in some cases all of the savings resulting from such refinancings. If the mortgagor has only one opportunity to initiate the refinancing process, the decision to refinance can be even more critical to mortgagor's finances. In addition, while refinancing consumer debt today may result in considerable savings for the consumer, refinancing the same debt tomorrow may make even better sense depending upon future interest rates.

Accordingly, there is a need for determining for a given debt instrument whether it is optimal at any given time or for any given conditions to initiate the refinancing process or to lock the interest rate on a debt instrument, such as the interest rate on a mortgage.

SUMMARY OF THE INVENTION

In accordance with one aspect of the present invention, an indicator is calculated to help in determining whether to refinance a consumer debt instrument by another debt instrument. The indicator is computed by (1) determining a change in cash flow values using a yield curve (2) determining the change in option values using a yield curve and the volatility of the interest rate at the time of the proposed financing; (3) determining the indicator by comparing the change in cash flow values with the change in option values.

In accordance with another aspect of a system for calculating an indicator for determining whether it is probabilistically advisable to refinance a consumer debt instrument with another consumer debt instrument includes: a CPU, an operating program operatively associated with said CPU, and a computer program code operatively associated with said CPU and said operating program. The computer program code contains a first set of instructions for calculating a change of cash flow values. The computer program code includes a second set of instructions for calculating a change in option values and a third set of instructions for comparing the change in cash flow values with the change of option values to calculate the indicator reflecting the advisability of refinancing.

DETAILED DESCRIPTION OF THE INVENTION

It has been discovered that the mortgagor can make a rational decision of whether to refinance a mortgage based on a rigorous probabilistic analysis rather than based as a gut reaction.

Prepayment of a mortgage involves both the turnover option and the refinance option. The turnover option is the right to pay off the mortgage early without penalty, such as when a homeowner sells the house. Similarly, the refinance option is the right to pay off the mortgage early so that it can be refinanced, almost always at a lower interest rate. The exercise rate of the turnover option is quite high, particularly with thirty-year mortgages, because most homes are sold before the mortgage is fully amortized. However, the timing of the exercise of this option varies greatly. Some people stay in their home for two or three years before moving, while others may stay in the same home for ten, fifteen, or twenty years, if not longer. Therefore, the value of the turnover option to a homeowner varies inversely with the length of time that person owns the home.

For mortgage lenders, the turnover option is a mixed blessing from a reinvestment perspective. Homes are sold for a variety of reasons, including job transfers, divorces, deaths, or simply the desire to move to a larger home in the same community. As such, the turnover option is somewhat independent of mortgage interest rate fluctuations. Consequently, a lender sometimes is able to reinvest the proceeds from a home-sale mortgage prepayment at a higher interest rate, which is beneficial to the lender, while at other times the proceeds must be invested at a lower interest rate, which is detrimental to the lender. To the extent that exercise of the turnover option accelerates during a period of declining interest rates, the net effect of the turnover option on lenders is somewhat negative, which explains why most mortgages have fees embedded into the interest rate to pay for this option.

The refinance option boosts the mortgage interest rate because this option almost always is exercised when it is beneficial for the homeowner to do so. That is, homeowners often refinance to gain a lower interest rate on the replacement subsequent mortgage. Consequently, the exercise of the refinance option almost always is costly to mortgage lenders, which explains why most mortgages have fees embedded into the interest rate to pay for this option. Rarely is a mortgage refinanced at a higher interest rate.

In effect, these FRMs have an embedded prepayment option that is not explicitly priced. Instead, the contract or stated mortgage interest rate includes the implicit cost of this option. The additional interest homeowners pay for this embedded option compensates investors should a homeowner prepay a mortgage and deprive the investors of the full amount of interest that would have been earned over the contractual life of the mortgage.

Rarely are these costs taken into consideration when calculating the effective interest rate of a mortgage because the effective rate is not determined until after the mortgage has been paid in full. However, refinancing costs typically add twenty-five to fifty basis points (bps), or 0.25% to 0.50%, to the stated mortgage interest rate if the mortgage is refinanced every two or three years.

At present, there is no way of determining when refinancing a consumer debt instrument is optimal.

DETAILED DESCRIPTION OF THE PREFERRED EMBODIMENTS

As consumer debt instruments, such as home mortgages and home improvement loans, are essentially callable amortized bonds, the principles regarding the refunding of bonds provide a good basis from which the optimal time to refinance consumer debt instruments can be determined. In bond theory, a call or redemption option enables the borrowing corporation to buy back the bond at a stated price prior to maturity, thereby allowing the borrower to replace the bonds with a lower-cost issue should interest rates fall. This is often referred to as "refunding."

The concept of refunding efficiency, which is the ratio of savings to the value of the call option, was established by W. M. Boyce and A. J. Kalotay in the late 1970s. See W. M. Boyce and A. J. Kalotay, *Tax Differentials and Callable Bonds*, 34 J. OF FIN. 825, 831 (Sep. 1979). For a non-callable bond, the refunding efficiency was defined as:

$$\text{Efficiency}_{original} = \text{Cash Flow Savings/Forfeited Option Value},$$

whereby "Cash Flow Savings" is the present value of the differences in the bond cash flows plus the transaction cost and "Forfeited Option Value" is the present value of the call option embedded in the outstanding bond. Since the latter always exceeds the former, which is the intrinsic value of the option, the efficiency cannot exceed 100% and is equal to 100% when and only when it is optimal to refund the bond.

According to this formula, the present value of savings is easily determined by discounting the differential cash flows. The need to discount can be avoided if the cash flows of the outstanding and refunding issues are assumed to be identical. In this case, the present value of savings is the proceeds of the new issue (which presumably exceed the call price) less the total cost of calling (call price plus transaction costs).

One way to is to extend the definition of refunding efficiency to include the option value in the refunding bond is to define it as follows:

$$\text{Efficiency}_{original} = (\text{Change in Cash Flow Value} + \text{Option Value}_{new})/\text{Option Value}_{old},$$

whereby "Change in Cash Flow Value" is the difference between the old and new bond cash flows minus the net transaction cost. With this modified equation, refunding never exceeds 100% and is equal to 100% if and only if it is optimal to refund the bond.

However, this definition of refunding efficiency can give misleading results. For instance, consider the scenario of refunding a callable bond by an identical new bond including the call option. This is clearly an undesirable transaction, because the prospective cash flows remain the same but transaction costs have been incurred. Yet, the modified definition assigns a positive efficiency to this transaction, and if the transaction costs are a small fraction of the option value, the efficiency can even approach 100%.

Therefore, the correct formula is obtained by considering the effect of the transaction at the margin and defining the refunding efficiency as:

Efficiency$_{new}$=Change in Cash Flow Value/Change in Option Value.

With this definition, efficiency is equal to 100% if and only if it is optimal to refund the bond. In other words:

Efficiency$_{new}$≦Efficiency$_{original}$≦100% for any plausible financial transaction. Refunding a bond with an identical bond has infinitely negative efficiency. If the new issue is maturity-matched and non-callable, the definition of refunding efficiency reduces to the original definition above.

This definition of refunding efficiency can be applied to corporate bonds in determining when the optimal time is to refund or call the bond. For instance, suppose that a highly rated corporate issuer is considering refunding a 4.25% bond with five years remaining to maturity, callable at any time at 100. Assume that currently the corporation could issue five-year non-callable "bullet" bonds at 3.97%, and the transaction cost, including that of issuing the new bond, would amount to 0.375% of the principal. Refunding would obviously result in cash flow savings over five years. In deciding whether it really makes sense to refund the bond, the savings must be compared to the option value. The calculation of savings requires the issuer's yield curve as provided by the issuer. Calculating the option value requires an interest rate model calibrated to the issuer's yield curve and set to the appropriate volatility. For purposes of this example, it is assumed that interest rates follow a lognormal random walk with a short-term volatility of 16%.

Based on this information, as a percent of outstanding principal, the present value of the remaining cash flows out to maturity is 101.271% and the option value is 1.164%. Thus, savings would be 101.271−(100+0.375), or 0.896%. The refunding efficiency is therefore 0.896%/1.164%, or 76.98%, which is significantly below the optimal value of 100%. In other words, it would not be optimal to refund the bond at this time. The calculations can be repeated over a range of interest-rate or so-called "coupon" levels, from which it can be concluded that any five-year bond as defined above with a coupon above 4.48% should be refunded immediately, while one with a lower coupon should be left outstanding.

As consumer debt instruments are essentially callable amortized bonds, the principles regarding the refunding of corporate bonds can be applied to define the refinancing efficiency. That is, using the above equations, it is possible to determine when the optimal time is for refinancing a consumer debt instrument.

Similar to above, a yield curve is required for discounting the cash flows. A yield curve is defined as: "[a] graph showing the term structure of interest rates by plotting the yields of all bonds of the same quality with maturities ranging from the shortest to the longest available." See DICTIONARY OF FINANCE AND INVESTMENT TERMS 797 (John Downes & Jordan Elliot Goodman eds., Barron's 6th ed., 2003).

Other critical inputs include a stochastic interest rate model for computing the value of the refinancing option. Additionally, a proper refinancing analysis must consider the homeowner's "borrowing horizon." For example, if the homeowner were planning to move five years from now, the borrowing horizon would be five years, rather than thirty. Often it is assumed that the borrowing horizon coincides with the maturity of the mortgage.

Refinancing efficiency depends on the underlying assumptions; it obviously increases if either the rate of the new mortgage or the transaction cost declines with all other factors held constant. Yet, refinancing efficiency also can be affected by interest rate volatility. Volatility is defined as "[the] characteristic of a security, commodity, or market to rise or fall sharply in price within a short-term period." See DICTIONARY OF FINANCE AND INVESTMENT TERMS 776 (John Downes & Jordan Elliot Goodman eds., Barron's 6th ed., 2003).

On one hand, interest rate volatility affects only option values and not savings. If the new issue is non-callable, higher volatility increases the forfeited option value and therefore reduces the efficiency. The refinancing of consumer debt instruments is fundamentally different, because the new instrument or mortgage also has an option. Therefore, what happens to the difference between the old and new option values becomes critical.

The volatility in question is that of the short-term rate. It has been found that the refinancing efficiency of a consumer debt instrument gradually declines as interest rate volatility increases. Additionally, as volatility increases, instead of steadily declining, efficiency actually approaches an asymptote. The existence of an asymptote suggest that the higher the volatility, the longer the wait will be before refinancing. If, however, the efficiency is near 100% even at a high volatility, there is little justification for waiting.

To illustrate an example of the present invention, an embodiment of the present invention shown in the Figures will now be described. It should be emphasized that the description of this embodiment is not intended to limit the invention as the invention is defined by the claims.

Figure 1:
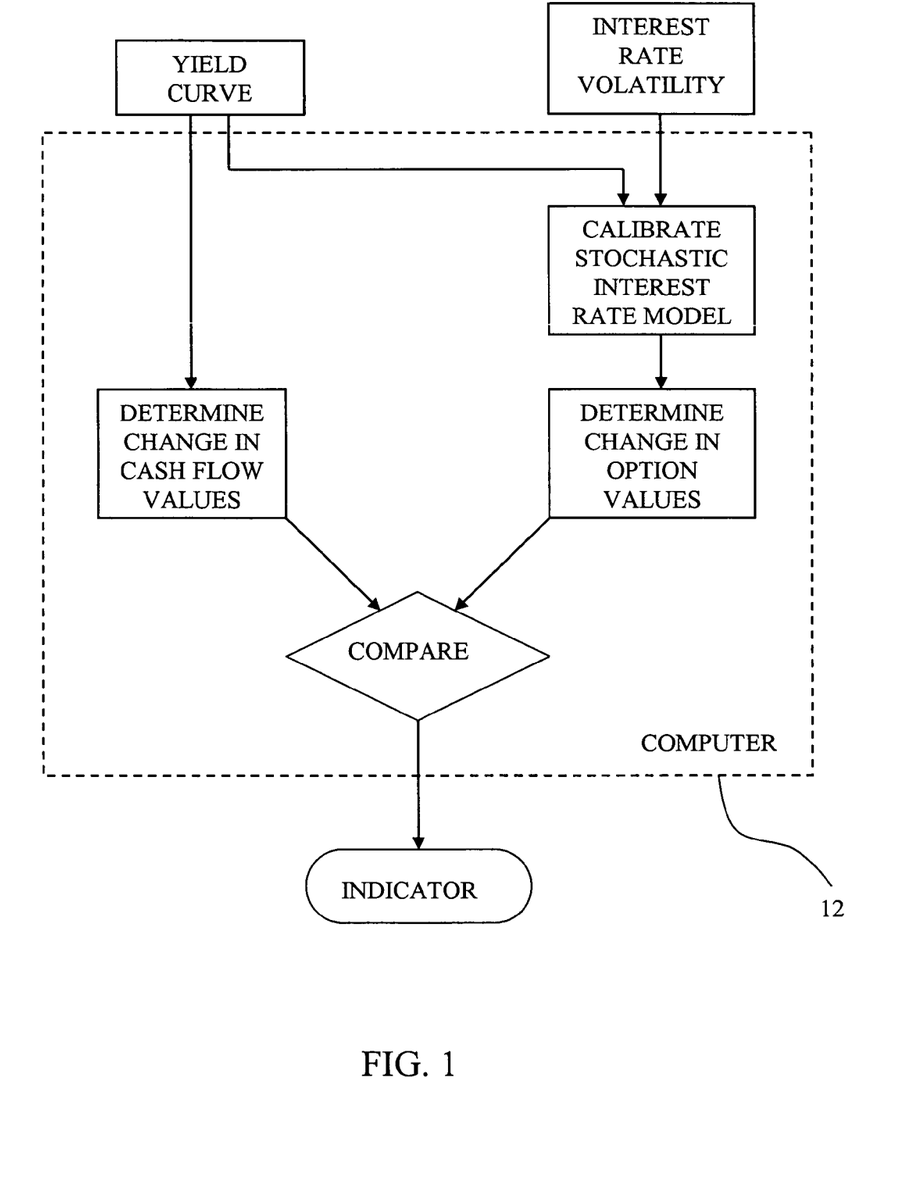
FIG. 1 is a diagram illustrating the method of the present invention.

With reference to FIG. 1, a system and method are disclosed for implementation on a computer 12 having a CPU and a computer code. The computer code has a first set of instructions for determining the change in cash flow values using a yield curve. The computer has a second set of instructions for determining the change in option values using a yield curve and the volatility of the interest rate at the time of the proposed refinancing. The computer has a third set of instructions for determining an indicator which reflects whether refinancing is statistically advisable by comparing the change in cash flow values with the change in option values. The computer has a fourth set of instructions for calculating savings resulting from refinancing. The computer has a fifth set of instructions for determining a second indicator showing a statistical advisability of refinancing taking into account income tax considerations of the debtor.

As illustrated in FIG. 1, the computer 12 implements the method of the present invention by first determining the change in cash flow values, which is derived from a yield curve. Next, the step of determining the change in option values is carried out using a yield curve and the volatility of the interest rate at the time of the proposed refinancing. Finally, the step of determining an indicator is carried out by comparing the change in the cash flow values with the change in option values. The indicator can be used for determining whether to refinance a first debt instruction (such as a mortgage) with a second debt instruction (such as a mortgage).

The system and method of the present invention relate to the determination of the optimal time to refinance a consumer debt instrument. As consumer debt instruments are essentially callable amortized bonds, the optimal time to refinance can be determined by calculating the refinancing efficiency 14. Specifically, the refinancing efficiency 14 is defined as:

Efficiency$_{new}$=Change in Cash Flow Value/Change in Option Value.

With this definition, the refinancing efficiency 14 is equal to 100% if and only if it is optimal to refinance the consumer debt instrument. With values less than 100%, there is some degree of risk involved in the decision to refinance. For instance, it may be appropriate to refinance a consumer debt instrument when the refinancing efficiency is 95%. On the other hand, it may be premature to refinance if the efficiency is only 75%.

Figure 2:
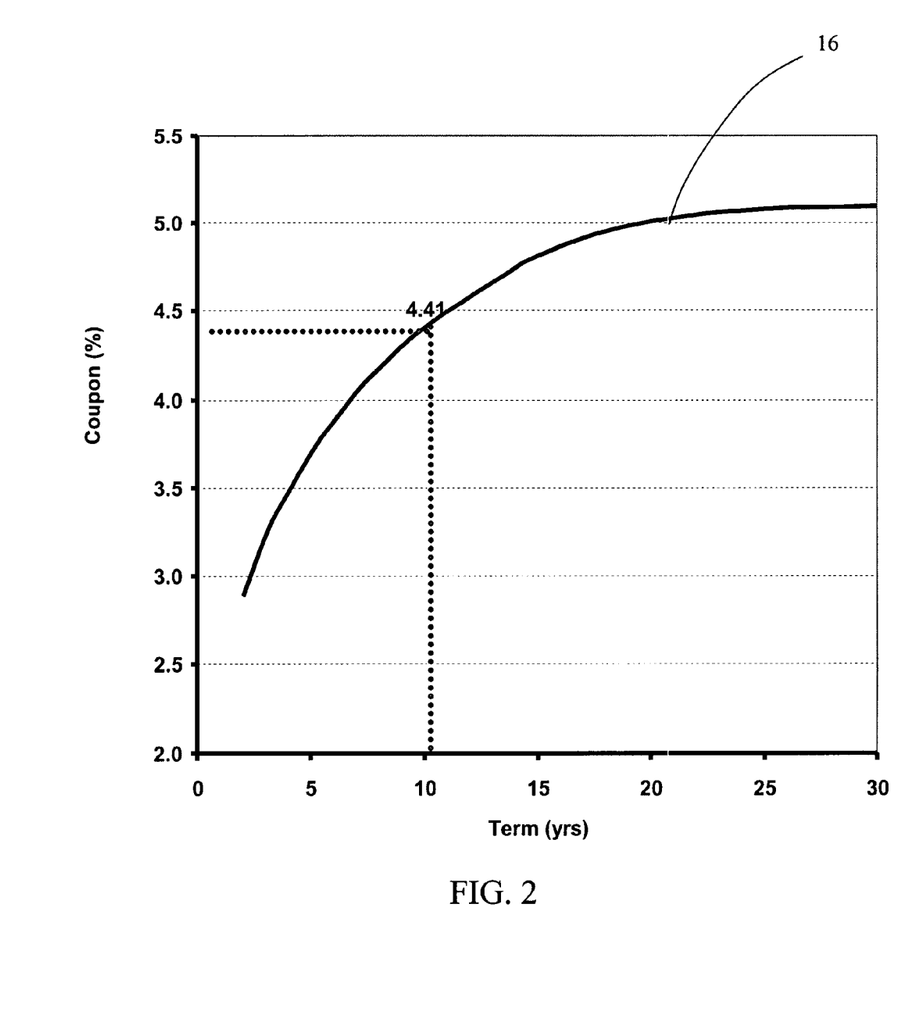
FIG. 2 is an example of a yield curve which can be used in accordance with one embodiment of the present invention.

In calculating the refinancing efficiency 14, a yield curve 16 is needed for discounting the cash flows. One particular type of yield curve 16 is the swap curve, as shown in FIG. 2. The specific swap curve for a given type of consumer debt instrument is available from services such as Reuters-Telerate. The swap curve is currently preferred; however, any yield curve 16 that is most helpful in determining the appropriate cash flow discounting should be used.

Figure 3:
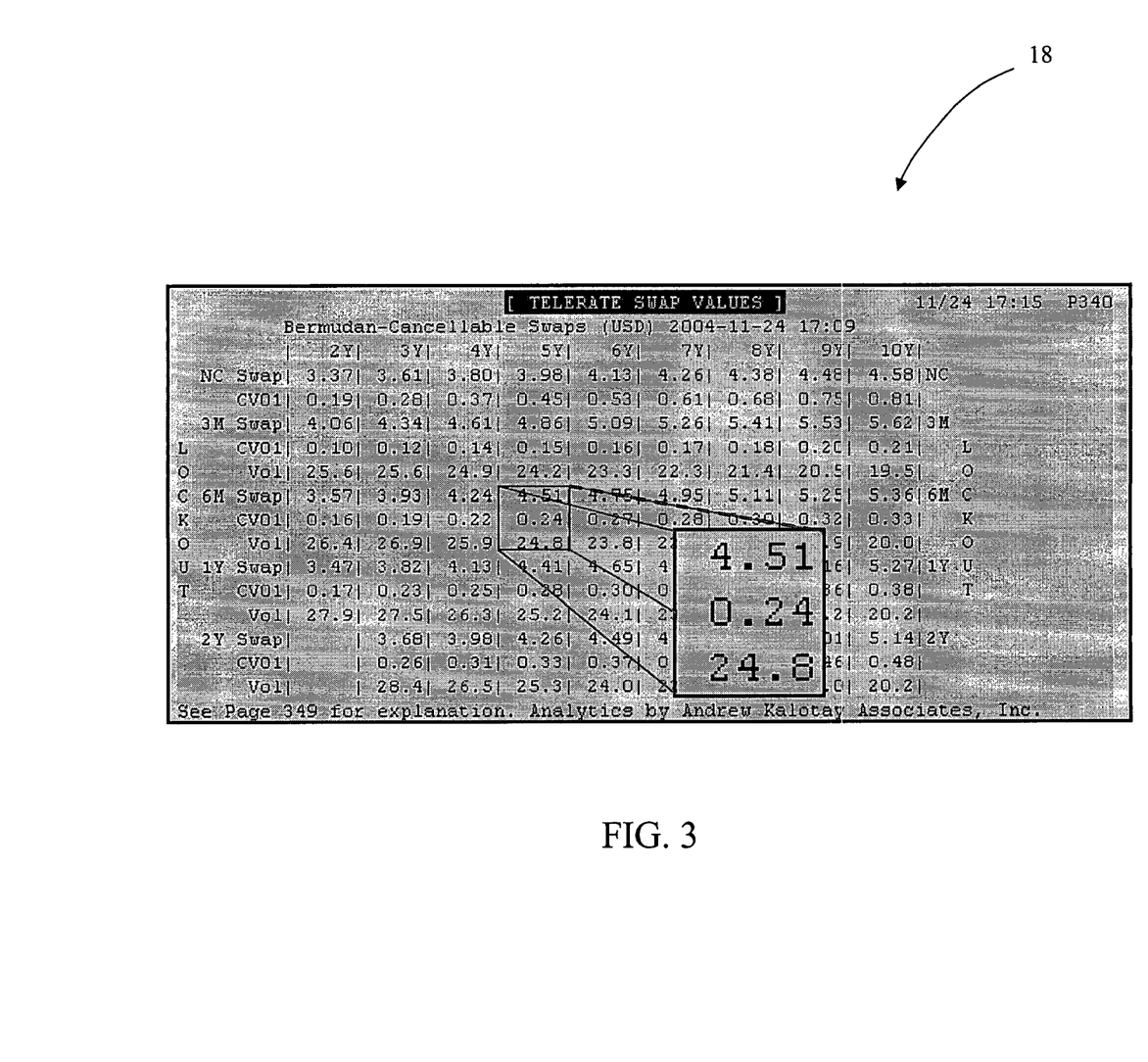
FIG. 3 is a table of interest rate volatilities applicable to the present invention.

Additionally, a stochastic interest rate model is necessary for computing the value of the refinancing option. The stochastic interest rate model is calibrated to a given yield curve 16 and a given table of interest rate volatilities 18, which are available from services such as Reuters-Telerate, as shown in FIG. 3. In the examples used herein, the stochastic interest rate model is calibrated to a yield curve appearing in Table 1 below:

TABLE 1

USD Swap Curve of Nov. 12, 2004

| | Term | | | | | |
|---|---|---|---|---|---|---|
| | 2 yr | 5 yr | 7 yr | 10 yr | 15 yr | 30 yr |
| Rate (%) | 3.20 | 3.97 | 4.32 | 4.67 | 5.06 | 5.33 |

For example, suppose that a homeowner is deciding whether to refinance a 5.75% thirty-year mortgage with a new 5.50% thirty-year mortgage without points and at a transaction cost equal to 1% of the principal. Because at the current 5.50% rates the homeowner would save 0.25% annually and thus recover the 1% transaction cost in roughly four years, refinancing would certainly result in cash flow savings. On top of that, the new mortgage can be refinanced again should rates decline further. These benefits must be weighed against the forfeited option value of the outstanding 5.75% mortgage.

The present value of the 5.50% mortgage is 108.628% and its option value is 8.628%. Similarly, the present value of the 5.75% mortgage is 111.640% and its option value is 10.874%. With a transaction cost of 1%, refinancing would save 111.640−(108.628+1.00), or 2.012%. Additionally, the reduction in option value would be 10.874−8.628, or 2.246%. Accordingly, the refinancing efficiency 14 would be 2.012/2.246, or 89.6%. As this value is considerably less than 100%, which is defined as optimal, then the 5.75% mortgage should not be refinanced.

Figure 4:
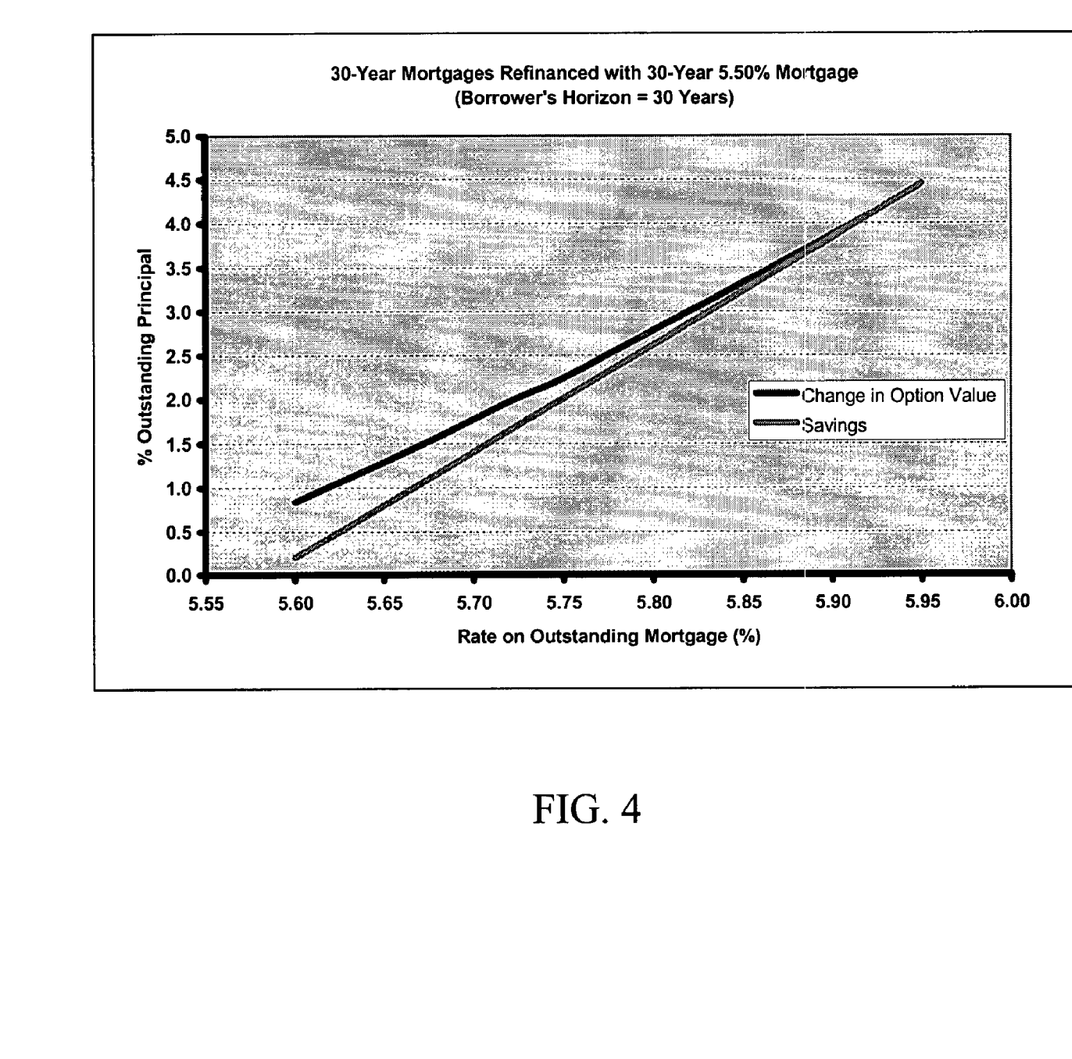
FIG. 4 is a graph showing the savings and the change in option value for a range of mortgage rates.
Figure 5:
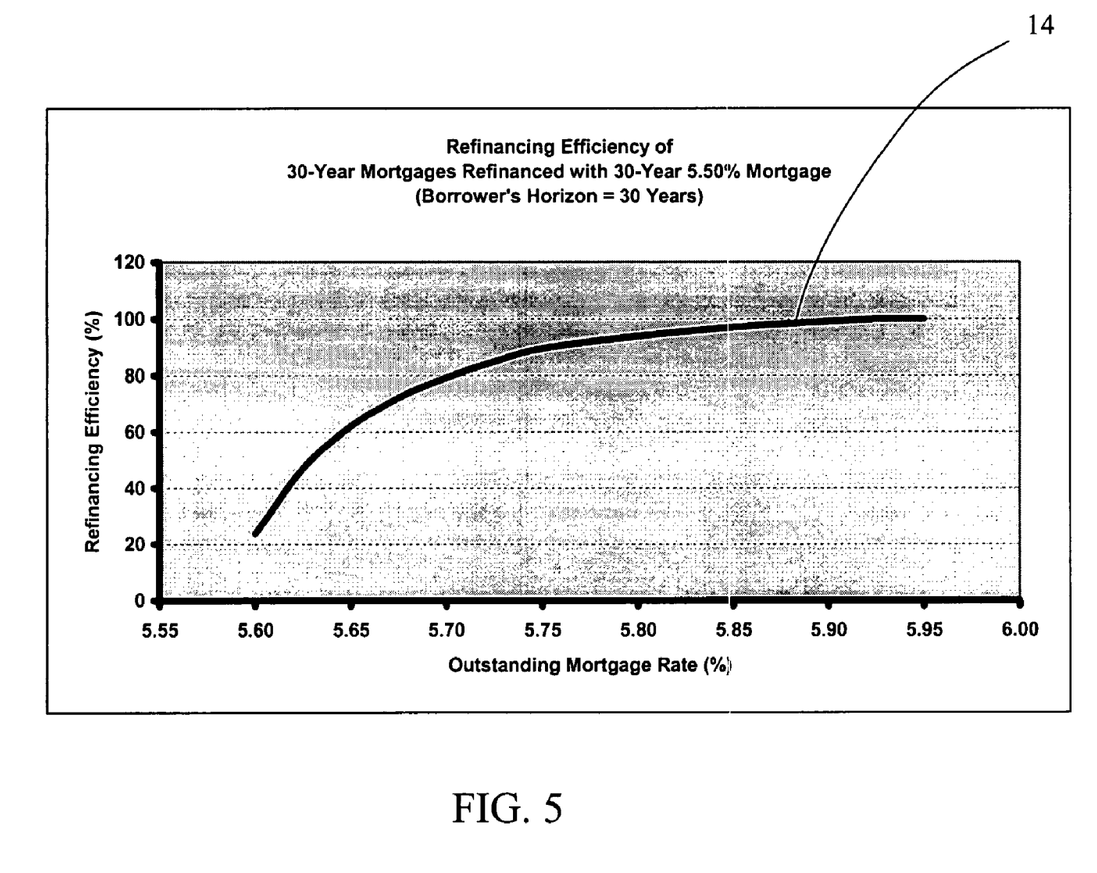
FIG. 5 is a graph showing the refinancing efficiency corresponding to FIG. 4.

In this situation, the refinancing efficiency 14 can be used to determine when refinancing the 5.75% mortgage would be appropriate. FIG. 4 shows the savings to the change in option value for a range of mortgage rates, and FIG. 5 shows the corresponding refinancing efficiency 14. The optimal efficiency of 100% is reached when the rate on the outstanding mortgage is 5.94%, which happens to be 44 basis points, or 0.44%, above the current 5.50% rate. Accordingly, in this situation, a long-term mortgage should be refinanced only if its rate exceeds 5.94%.

Refinancing efficiency 14 also is affected by the level of interest rate volatility. On one hand, interest rate volatility affects only option values and not savings. If the new issue is non-callable, higher volatility increases the forfeited option value and therefore reduces the efficiency. The refinancing of consumer debt instruments is fundamentally different, because the new instrument or mortgage also has an option. Therefore, what happens to the difference between the old and new option values becomes critical.

Figure 6:
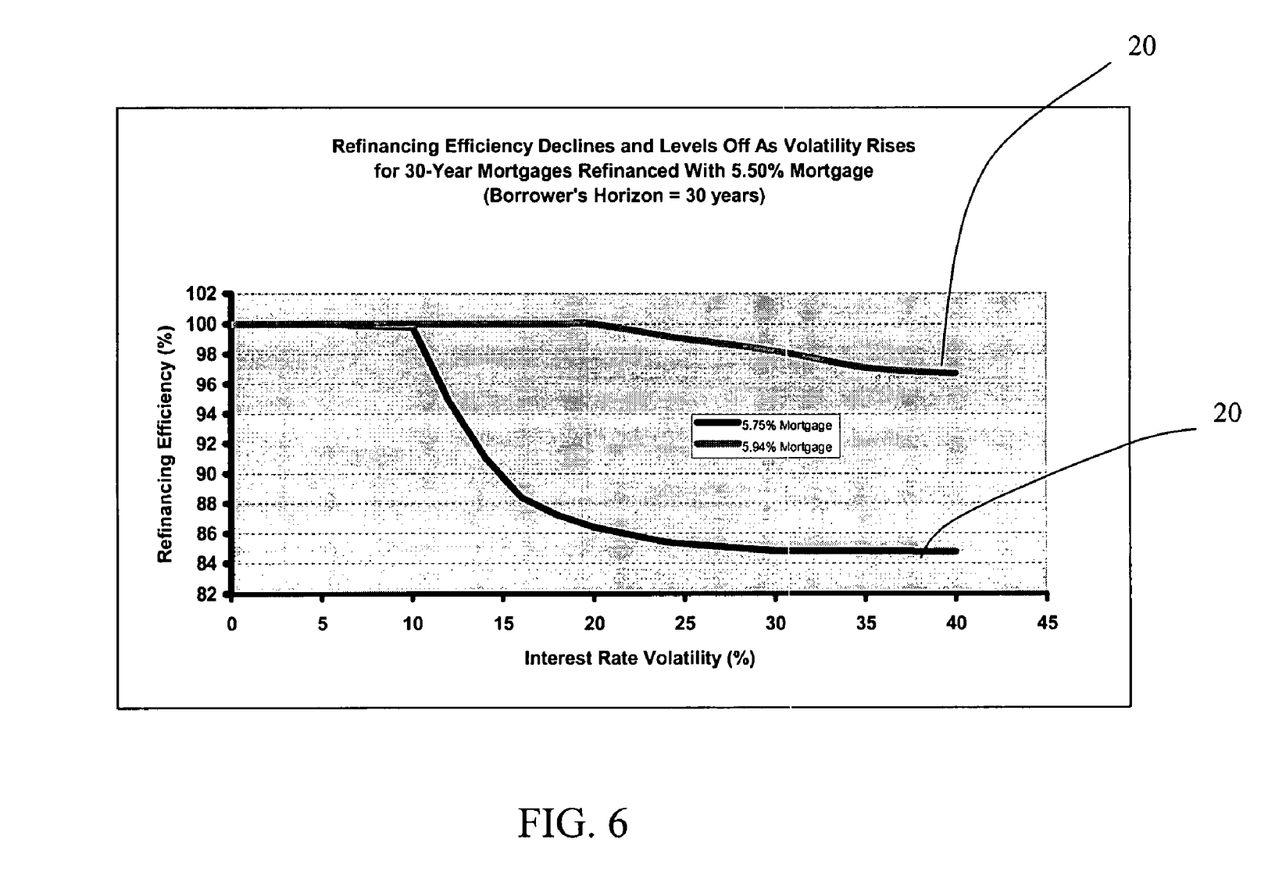
FIG. 6 is a graph of the effect of interest rate volatility on the efficiency of refinancing a mortgage.

The relevant range for interest rate volatility is that of the short-term rate. The closest matching market-implied volatilities are that of short-dated American swaptions, which generally have been between 12% and 30%, depending on the shape and level of the specific yield curve and the option. FIG. 6 shows the effect of interest rate volatility on the efficiency of refinancing a 5.75% mortgage and a 5.94% mortgage with a 5.50% mortgage, assuming a 1% transaction cost.

As shown in FIG. 6, the refinancing efficiency of both mortgages gradually declines as volatility increases. Because within the relevant range the efficiency of the 5.75% mortgage is well below 100%, it can be concluded that a 25 basis points savings in coupon is insufficient. In contrast, the efficiency of the 5.94% mortgage exceeds 98% even at 30% volatility, which suggests that there is little to be gained by waiting.

As volatility increases, instead of steadily declining, efficiency actually approaches an asymptote 20, as shown in FIG. 6. This asymptote 20 is roughly 85% for the 5.75% mortgage and 96% for the 5.94% mortgage. The existence of an asymptote 20 suggests that the higher the volatility, the longer the wait will be before refinancing. If, however, the efficiency is near 100% even at a high volatility, there is little justification for waiting.

Figure 7:
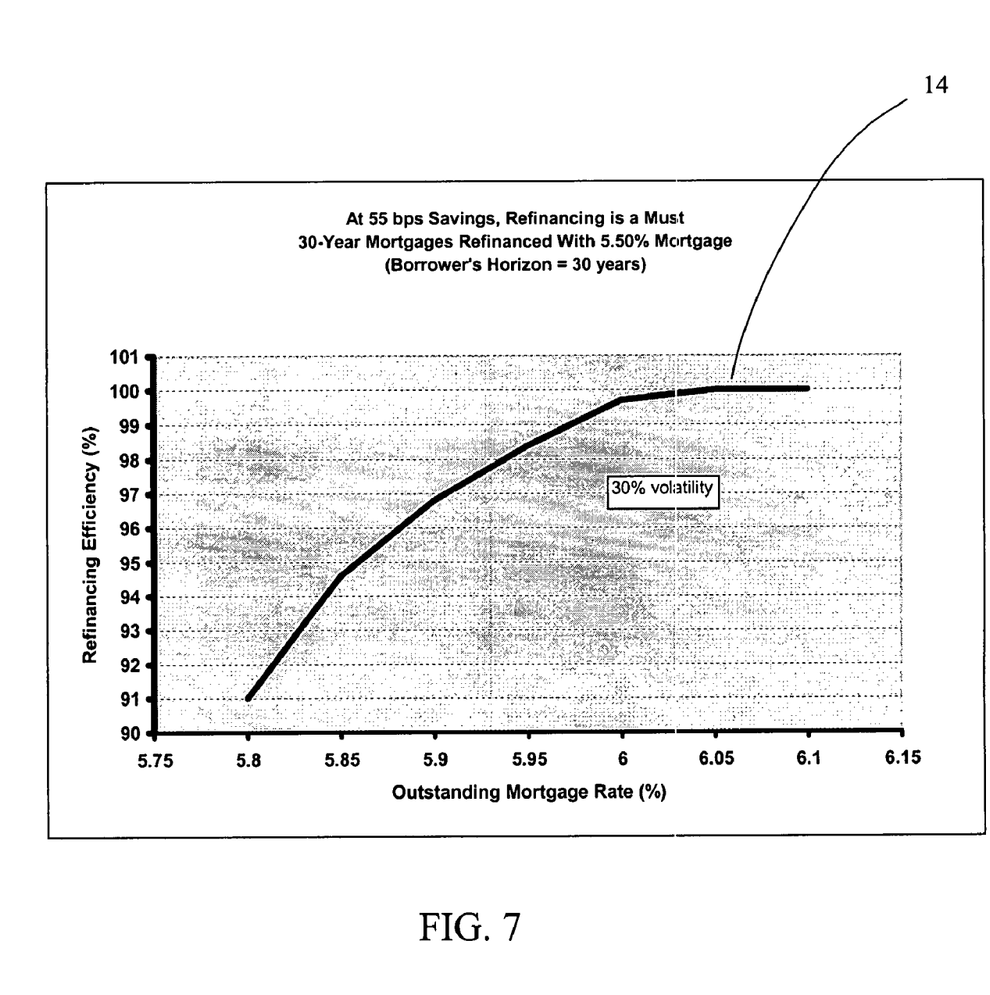
FIG. 7 is a graph showing the refinancing efficiency corresponding to FIG. 6.

In practice, 30% is certainly a reasonable upper bound for interest rate volatility. FIG. 7 shows the efficiency of refinancing various mortgages at this volatility, keeping the coupon of the new mortgage at 5.50%. The efficiency reaches 100% just below 6.05%, signaling that any mortgage with a higher coupon rate should be refinanced immediately. From this, it can be concluded that under the current interest rate environment, if the annual savings exceed 55 basis points (6.05%-5.50%), a long-term mortgage should be refinanced even under the most aggressive interest rate volatility assumptions.

The homeowner's borrowing horizon also has an impact upon the refinancing efficiency 14. In the previous examples, it was assumed that the homeowner's borrowing horizon coincided with the maturity of the outstanding mortgage. Yet this is not always the case, such as when a homeowner expects to be relocated within a specified number of years.

For instance, suppose that the maturity of the outstanding mortgage is thirty years but the homeowner's borrowing horizon is only five years. Common sense tells us that a thirty-year fixed coupon mortgage is not the proper refinancing vehicle, because the homeowner will be charged for an option that is worthless beyond five years. The right choice is a thirty-year adjustable rate mortgage (ARM) whose coupon is fixed for five years and is reset annually afterwards, which is also referred to as a "5/1 ARM." For a homeowner whose horizon is five years, the exposure to floating rates (beyond the fifth year) is irrelevant. Because the rate of a thirty-year fixed coupon mortgage is always higher than the rate of a thirty-year 5/1 ARM, a rational homeowner will not even consider the former alternative. From the perspective of a homeowner whose horizon is five years, a thirty-year mortgage looks like one that amortizes like a thirty-year mortgage but has a five-year balloon payment. With this insight, the interest rate model can be calibrated to the new 30-year 5/1 ARM rate, which for this example is 5.00%.

Figure 8:
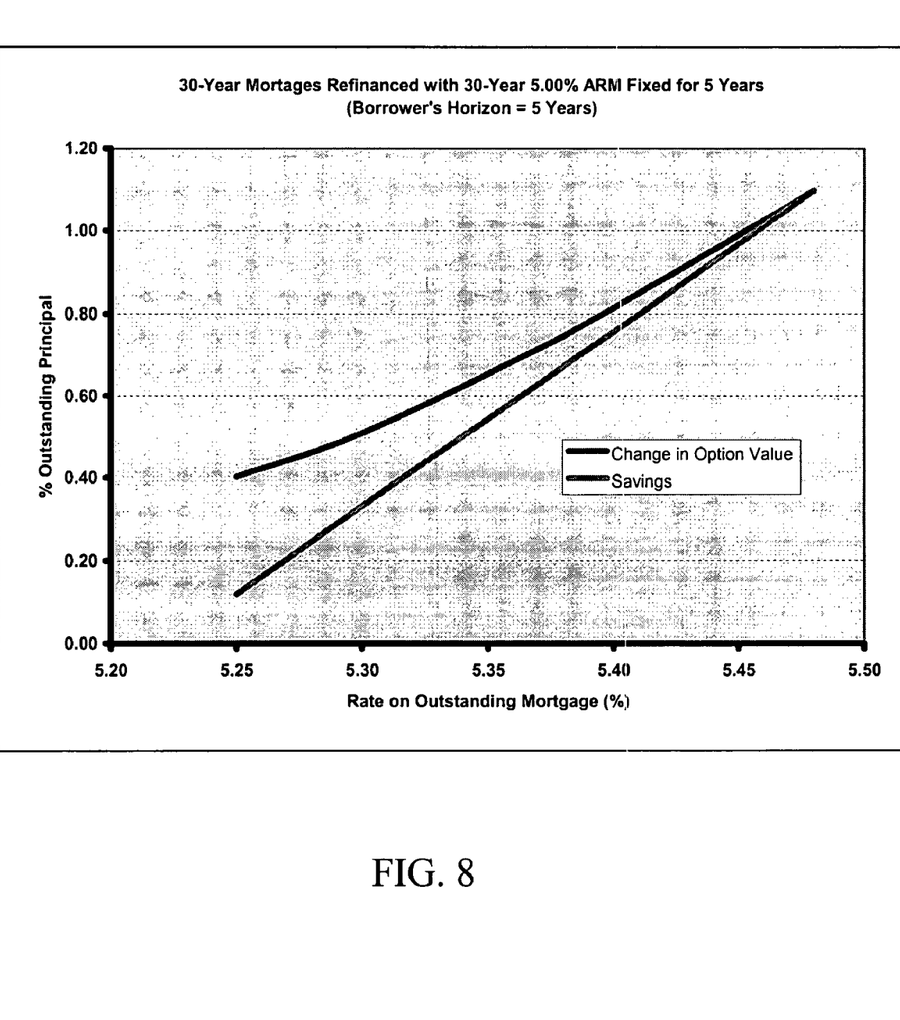
FIG. 8 is a graph of the savings and the change in option value resulting from refinancing mortgages with various coupons when the borrower's horizon is short.
Figure 9:
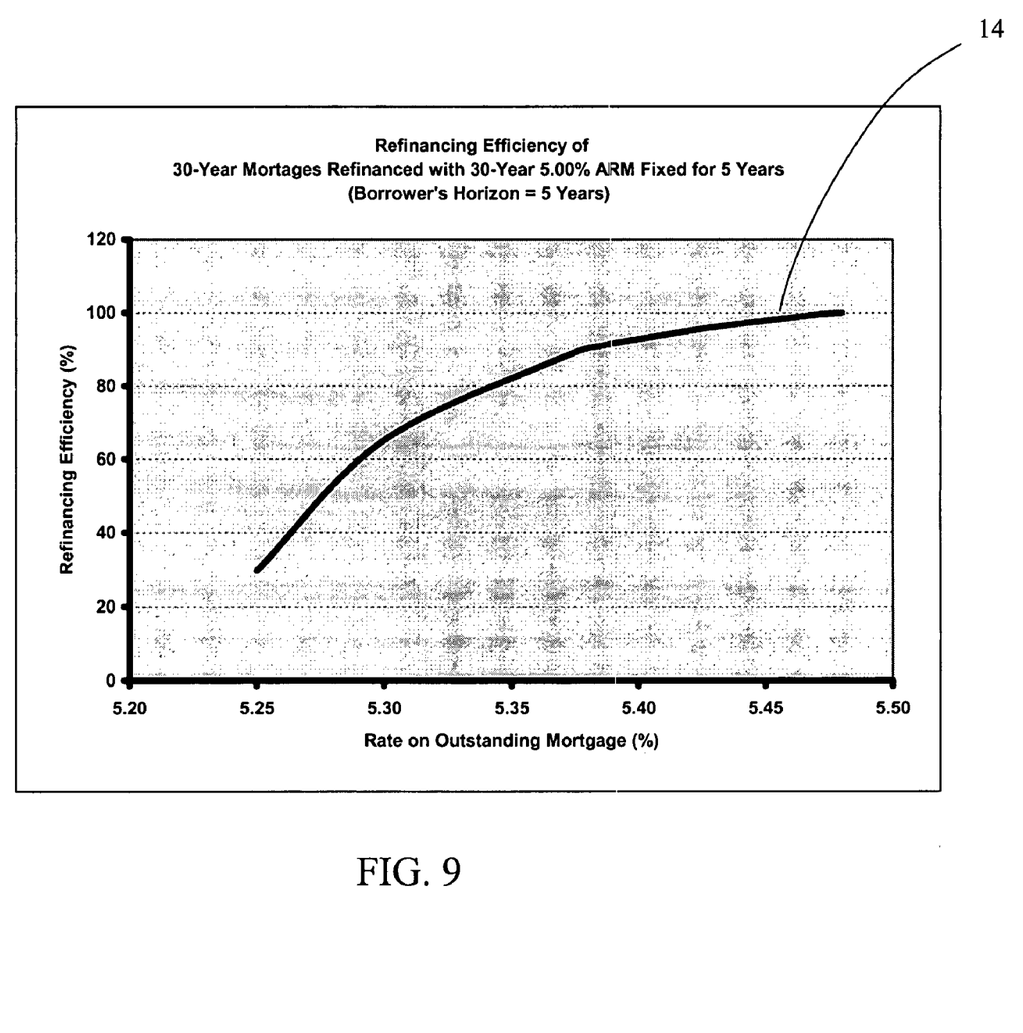
FIG. 9 is a graph showing the refinancing efficiency corresponding to FIG. 8.

The present value of the cash flows for a new 30 year 5/1 ARM is 100.416%, and the value of its call option is 0.416%. FIG. 8 shows the savings and the change in option value that would result from refinancing mortgages with various coupons, and FIG. 9 shows the corresponding refinancing efficiencies 14. The optimal threshold of 100% is reached when the rate on the outstanding mortgage is 5.48%, which is 48 basis points above the current 5% rate.

It is therefore seen that an options-based approach to deciding when to refund a callable corporate bond can be used to determine the optimal time to refinance a consumer debt instrument, such as a home mortgage or home improvement loan. Through use of the system and method of the present invention, the refinancing efficiency can be quickly and easily calculated, thereby providing guidance as to whether or not a consumer debt instrument should be refinanced, or how close to optimal the time is for refinancing.

The following example is provided to further illustrate the present invention. This example is not intended to limit the claimed invention in any manner. It should be noted that the required components are readily available from various vendors.

Consider the following example of a bond option-adjusted spread ("OAS") calculator module having the following inputs:
A par yield curve
A volatility
Terms and conditions of a callable fixed coupon amortizing bond And does the following:
Given the present value ("PV") of the bond, calculates its OAS
Given the OAS of the bond, calculates its PV and its option value ("OV").
This module may be referred to as the "BondOAS".
The Mortgage Refinancing Calculator has the following inputs:
Today's date
Swap curve as of today
Volatility
Terms of outstanding mortgage
Terms of new mortgage
Closing costs (as a percentage of principal)
These inputs are transformed into BondOAS as follows:
The par yield curve is the swap curve
The volatility is the volatility
The bond is specified as described below
Step 1: Use BondOAS to calculate the OAS of the new mortgage, assuming that it is priced at par. This is done as follows:
Set the terms and conditions of the bond as follows:
  Issue date=The first of the current month
  Maturity date=maturity date of outstanding mortgage
  Coupon=new mortgage coupon
  Amortization schedule=amortization schedule of new mortgage
  Continuously callable starting from 1 month after issue date until maturity
  Call price=100+closing costs
Compute the OAS using a bond PV of 100.
Compute the OV.
Step 2: Use BondOAS and the OAS obtained in Step 1 to calculate the value and option value of the outstanding mortgage. This is done as follows:
Set the terms and conditions of the bond as follows:
  Issue date=The first of the current month
  Maturity date=maturity date of outstanding mortgage
  Coupon=outstanding mortgage coupon
  Amortization schedule=amortization schedule of outstanding mortgage
  Continuously callable starting from 1 month after issue date until maturity
  Call price=100+closing costs
Compute the PV, given the OAS obtained in Step 1.
Compute the OV.
Step 3: Calculate the following quantities:
Savings=(PV obtained in Step 2)−100−closing costs
Loss of option value=(OV obtained in Step 2)−(OV obtained in Step 1)
This produces the Efficient, which is calculated by: Efficiency=(Savings/Loss of option value)*100.

The previous example can be adapted into an after-tax mortgage refinancing calculator through the following modifications:
Replace the BondOAS module by an after-tax bond OAS calculator module; and
Include the homeowner's tax rate as one of the inputs.
The calculator would compute the effective after-tax yield curve and use that curve to compute the value of the mortgage cash flows. The calculator would also compute the option value on an after-tax basis.

Many changes and modifications will occur to those skilled in the art upon studying this specification. All such changes and modifications which fall within the appended claims or within the spirit of the invention are intended to be included within the scope of the claim.

We claim:

1. A system for determining an indicator or its derivative, reflecting whether to refinance an outstanding consumer debt instrument with a new consumer debt instrument, said outstanding consumer debt instrument and said new consumer debt instrument each having a cash flow having a resent value and an option value, said system comprising:
    a CPU;
    a computer code operatively associated with said CPU, which when implemented causes a series of actions, said computer code comprising the following instructions:
        a first set of instructions, said first set of instructions configured to calculate a change in said present value of the cash flows using a set of discount factors;
        a second set of instructions, said second set of instructions configured to calculate a change in option values using a probabilistic model of future discount factors; and
        a third set of instructions, said third set of instructions configured to calculate the indicator by comparing said change in cash flow values with said change in option values;
    an input device operatively connected to said CPU, said input device configured to receive or obtain said discount factors and said probabilistic model of future discount factors and configured to transmit them to said CPU; and
    an output device operatively connected to said CPU, said output device configured to provide said indicator to a user or a third party.

2. The system of claim 1 further comprising a visual display for depicting the indicator in human readable form.

3. The system of claim 1 further comprising an audio device for communicating the indicator.

4. The system of claim 1 further comprising an electronic message reflecting the indicator.

5. The system of claim 1 further comprising a fourth set of instructions configured to calculate a derivative of said indicator.

6. The system of claim 1 wherein the present value of the cash flows is calculated using a yield curve.

7. The system of claim 1 wherein the present value of the cash flows is calculated using a yield curve and either a spread curve or an option-adjusted spread.

8. The system of claim 1 wherein the change in option values is calculated using a probabilistic model of future discount factors based on a yield curve.

9. The system of claim 8 wherein the probabilistic model is calculated using at least one interest rate volatility index.

10. The system of claim 2 wherein the third set of instructions is configured to calculate the indicator by dividing the change in the present value of the cash flows by the change in option values.

11. The system of claim 10 the calculations of the probabilistic model further use at least one swaption volatility.

12. The system of claim 1 wherein the outstanding consumer debt instrument is an outstanding mortgage and the new consumer debt instrument is a new mortgage.

13. The system of claim 2 wherein the outstanding consumer debt instrument is an outstanding mortgage and the new consumer debit instrument is a new mortgage.

14. The system of claim 1 further comprising a fifth set of instructions configured to calculate monetary savings from refinancing.

15. The system of claim 1 further comprising a sixth set of instructions configured to determine a second indicator for determining a probabilistic advisability of refinancing taking into account income tax consequences of the debtor.

16. The system of claim 1 wherein the indicator is a refinancing efficiency expressed in percentages.

17. The system of claim 1 wherein the change in option values is calculated using a probabilistic model of discount factors based on the swap curve, a spread curve or an option-adjusted spread.

18. A method for calculating an indicator for determining whether to refinance an outstanding consumer debt instrument with a new consumer debt instrument, said outstanding consumer debt instrument and said new consumer debt instrument each having a cash flow having a present value and an option value, the method comprising the following steps of:
providing a CPU;
providing a computer code operatively associated with said CPU, which when implemented causes a series of actions;
providing an input device operatively connected to said CPU, said input device receiving or obtaining a set of discount factors and a probabilistic model of future discount factors and transmitting them to said CPU;
providing an output device operatively connected to said CPU, said output device providing said indicator to a user or a third party;
using said computer to determine a change in said present value of said cash flows using a set of discount factors;
using said computer to determine a change in option values using a probabilistic model for future discount factors; and
using said computer to determine said indicator by comparing the change in cash flow values to the change in option values.

19. The method of claim 18 further comprising a step of displaying the indicator in a human readable form.

20. The method of claim 18 further comprising a step of transmitting the indicator via an audio device.

21. The method of claim 18 further comprising a step of transmitting the indicator electronically.

22. The method of claim 18 wherein the change in the present value of cash flows is determined from a yield curve and an option-adjusted spread.

23. The method of claim 19 wherein the change in the present value of cash flows is determined from a yield curve and an option-adjusted spread.

24. The method of claim 18 wherein the change in option values is determined using at least one volatility index.

25. The method of claim 18 wherein the change in option values is determined using an LIBOR index.

26. The method of claim 18 wherein the indicator is determined by dividing the change in the present value of cash flows by the change in option values.

27. The method of claim 19 wherein the indicator is determined by dividing the change in the present value of cash flows by the change in option values.

28. The method of claim 18 wherein the displayed indicator comprises a word indication of advisability of refinancing.

29. The method of claim 18 wherein the indicator comprises words "yes" or "no".

30. The method of claim 18 wherein the displayed indicator comprises a percentage indicating probabilistic financial advisability of refinancing.

31. The method of claim 19 wherein the consumer debt instrument is a mortgage.

32. The method of claim 19 wherein the consumer debt is a mortgage.

33. The method of claim 18 further comprising the step of taking into account tax consequences of refinancing in determining the indicator.

34. The system of claim 15, wherein the income tax consequences are incorporated by using tax-adjusted discount factors and a tax-adjusted callable bond valuation model.

35. The method of claim 33, wherein the income tax consequences are incorporated by using tax-adjusted discount factors and a tax-adjusted callable bond valuation model.

* * * * *